United States Patent Office 2,715,561
Patented Aug. 16, 1955

2,715,561

METHOD OF PREPARING THIOPHOSPHORYL-CHLORIDE

Florian F. Knotz, Graz, Austria

No Drawing. Application October 2, 1953,
Serial No. 383,935

8 Claims. (Cl. 23—14)

This invention relates to an improved method of making thiophosphorylchloride by the reaction of sulfur and $PCl_3$. Sulfur does not combine with $PCl_3$ under ordinary conditions. However, it was found that the reaction was catalyzed by the presence of anhydrous $AlCl_3$, Knotz, Oesterr. Chemiker Zeitung 50, 128 (1949). Although $AlCl_3$ effectively catalyzes the combination of S with $PCl_3$ under ordinary conditions, efforts to employ Al metal in conjunction with halogen have heretofore been unsuccessful.

In accordance with the present invention it has been discovered that reaction of S and $PCl_3$ is catalyzed by either Al or Fe in the presence of bromine or chlorine providing a trace of iodine is also present. The metal should be finely divided. In the case of powdered iron it should be free of considerable amounts of FeO, $Fe_2O_3$ and $Fe(OH)_3$. Reduced iron is also satisfactory. The proportion may vary but about 3% on the $PCl_3$ has given excellent results. The iron can be used repeatedly to catalyze the desired reaction but it should be employed immediately for this purpose. Similarly, in the case of Al powder the results depend upon the quality used. Very pure and very finely divided Al requires less iodine than with inferior grades. About 1% Al powder on the $PCl_3$ has given good results although this proportion is subject to variation. Mixtures of Fe and Al powder are also intended.

It is advantageous to mix the metal powder, bromine and iodine with sulfur a short time before adding the $PCl_3$. Bromine in the range of 0.8–3% and iodine in the range of 0.2–0.8% on the $PCl_3$ have given excellent results. Iodine never can be replaced by any other halogen, whereas chlorine may be used instead of bromine. In this case a cold saturated solution of $PCl_3$ with $Cl_2$ is employed together with the other catalysts (Fe and $I_2$ or $Al+I_2$ or a mixture of $Fe+Al$ and $I_2$) in order to combine the $PCl_3$ with sulfur. Increasing the proportion of $I_2$ shortens the reaction time up to a certain degree. Conversely, decreasing the proportion of $I_2$ necessitates a higher proportion of $Br_2$ for comparable results. However, the yields are generally not affected, providing enough iodine is employed to start the reaction. All of the catalyst components with the exception of Al can be recovered and reused in subsequent reactions. The metal can be recovered by filtration or left with the heel from distillation of the crude reaction products. Any bromine and iodine contained in the $PSCl_3$ can be removed by treatment with cold dilute NaOH and recovered in known manner.

The catalyst combination described effects combination of S and $PCl_3$ under atmospheric pressure at refluxing temperature of the reaction mixture. The use of pressure equipment is therefore obviated. A trace of iodine is sufficient to initiate reaction. When Al powder is used, the reaction takes place with the evolution of considerable heat. Employing Fe powder, the reaction never becomes vigorous so that it is necessary to continue heating until the reaction is complete. Fe powder has the advantage that the reaction goes smoothly without the danger of explosions which may occur by using Al powder or $AlCl_3$ in higher amounts.

The following examples illustrate the invention in detail but are not to be taken as limitative thereof.

*Example 1*

Into a reaction vessel of suitable capacity fitted with a reflux condenser there is mixed 24 parts by weight of sulfur, 3 parts by weight of fine iron powder or reduced iron, 0.2 part by weight of iodine and 3 parts by weight of bromine in the order named. After about 5 minutes 100 parts by weight of $PCl_3$ are added and the mixture heated to refluxing temperature. The reaction is nearly complete after an hour's refluxing and complete after heating another 15 minutes. The iron powder is removed by filtration and used immediately for the next run. The crude $PSCl_3$ is distilled to yield 116 parts by weight, boiling range 124–127° C. The product is treated with an ice-cold solution of 100 cc. of 10–12% NaOH. The layer consisting of $PSCl_3$ is separated and dried with $CaCl_2$ or Na. A second distillation yields 112 parts by weight of $PSCl_3$, B. P. 124–126° C. A second distillation is not necessary as the product is essentially pure after drying. The catalysts are recovered from the residue after the first distillation by treating with 100 cc. of a warm 20–25% solution of NaOH. These caustic solutions may be used to recover catalysts from other runs until the NaOH is exhausted. The solutions are then united, the water evaporated and the $Br_2$ and $I_2$ recovered by one of the usual methods.

*Example 2*

Into a reactor of suitable capacity fitted with a reflux condenser and stirrer there is charged 24 parts by weight of powdered sulfur, 3 parts by weight of fine iron powder or reduced iron, 0.8 part by weight of iodine and 2 parts by weight of bromine, the additions being made in the order named. The mixture is allowed to stand for a short time and then 100 parts by weight of $PCl_3$ is added. The mixture is then heated to boiling for about 45 minutes at which time the reaction is complete. The end of the reaction can be observed when no more $PCl_3$ is condensed in the reflux condenser and iodine vapors are seen in the flask. Isolation of the product as described in Example 1 yields 110 parts by weight of $PSCl_3$, B. P. 124–126° C.

*Example 3*

A mixture of 24 parts by weight of sulfur, 3 parts by weight of iron powder, 0.7 part by weight of iodine and 2 parts by weight of bromine is prepared as described in the foregoing examples. After a few minutes 100 parts by weight of $PCl_3$ are added and the mixture heated to boiling. After heating for an hour substantially all of the $PCl_3$ is converted into $PSCl_3$. Isolating the product as described in Example 1 yields 108–110 parts by weight of $PSCl_3$, boiling range 124–126° C.

*Example 4*

A mixture of 24 parts by weight of sulfur, 3 parts by weight of iron powder, 0.6 part by weight of iodine and 2 parts by weight of bromine is prepared as described in the preceding examples. After a short time 100 parts by weight of $PCl_3$ are added and the mixture heated to boiling. A reaction period of 1½–2 hours is sufficient to convert substantially all the $PCl_3$ to $PSCl_3$. Isolation of the product as described in Example 1 yields 114 parts by weight of $PSCl_3$, boiling range 124–126° C.

*Example 5*

The reaction mixture described in Example 4 is prepared with the difference that the mixture of sulfur, iodine, bromine and iron powder is gently heated before adding PCl₃. The mixture becomes hot and iodine vapors are visible in the flask. When the mixture has nearly cooled to room temperature the PCl₃ is added and the reaction is carried out in the usual way by heating for an hour and 15 minutes. Isolating the product as described in Example 1 yields 110–112 g. of PSCl₃, boiling range 124–126° C.

*Example 6*

Into a reaction vessel fitted with reflux condenser there is mixed 5 parts by weight of sulfur, 0.6 part by weight Fe powder, 0.1 part by weight iodine and 20 parts by weight of PCl₃. The mixture is heated gently so that all of the iodine has dissolved. After cooling to room temperature there is bubbled in a stream of dry chlorine. The violet color of the mixture disappears. When the PCl₃ is saturated with chlorine the mixture is heated to refluxing temperature. After some time the violet color of the iodine gradually appears again and after 2–3 hours the reaction is complete. The iron is removed by filtration and immediately used for the next run. The crude PSCl₃ is distilled and the distilled product treated with an ice-cold solution of dilute NaOH in order to remove iodine, and other impurities. After separating the PSCl₃ and drying it with CaCl₂, the distillation yields 18–19 parts by weight PSCl₃, boiling range 124–127° C. The residue of the first distillation is treated with a concentrated solution of NaOH which may be used for treating the residues of other runs until the NaOH is exhausted. Then the caustic solutions are united and iodine recovered in the usual way. (NOTE.—Don't bubble chlorine into the boiling mixture because of the following equation: $2PSCl_3 + Cl_2 \rightarrow 2PCl_3 + S_2Cl_2$. See: Gmelin Kraut: Handbuch der anorganischen Chemie, I, 2, Seite 192, 7. Auflage (1909).)

*Example 7*

Into a reactor of suitable capacity fitted with a reflux condenser is charged 24 parts by weight of sulfur, 1 part by weight of Al powder, 0.3 part by weight of iodine, 1 part by weight of bromine and 100 parts by weight of PCl₃. The reaction mixture is heated to boiling. The foam on the boiling mixture is initially brown but gradually turns to violet and then after about 15 minutes the color gradually disappears, becoming colorless after 30 minutes. After about 45 minutes the reaction becomes quite violent but can be easily controlled by cooling with water or ice water. The reaction is complete within a few minutes. The reaction mixture is filtered to separate the Al powder and it is used immediately for the next run. Purification of the PSCl₃ as described in Example 1 yields 106–108 parts by weight, boiling range 124–126° C.

*Example 8*

Into a reactor of suitable capacity is charged 12 parts by weight of sulfur, 0.8 part by weight of bromine, 0.2 part by weight of iodine, 1 part by weight Al powder and 50 parts by weight of PCl₃. A vigorous reaction sets in at the boiling point of the PCl₃ which is terminated within a few minutes but the yield is lower with this higher proportion of catalyst due to side reactions.

*Example 9*

Into a reactor of suitable capacity fitted with a reflux condenser is charged 24 parts by weight of sulfur, 0.4 part by weight of Al powder, 2 parts by weight of iron powder, 0.2 part by weight of iodine, 0.8 part by weight of bromine and 100 parts by weight of PCl₃. The reaction mixture is heated to reflux for about 45 minutes. There is then added 0.1 part by weight of iodine and the heating continued for about 20 minutes or until the violet color of the foam disappears and a vigorous reaction sets in. The reaction is complete within a short time. Isolation of the product as described in Example 1 yields 107–110 parts by weight of PSCl₃, boiling range 124–126° C.

*Example 10*

Into a reactor of suitable capacity fitted with a reflux condenser is charged 5 parts by weight of sulfur, 0.2 part by weight Al powder, 0.1 part by weight of iodine and 20 parts by weight of PCl₃. The mixture is gently heated until all iodine has dissolved. After cooling to room temperature there is bubbled in a dry stream of Cl₂ until the violet color of the mixture has disappeared completely and the reaction mixture becomes slightly warm. When heating the mixture the violet color of the iodine appears again at the B. P. of PCl₃. After refluxing 25 minutes the mixture becomes colorless and after 30 minutes a vigorous reaction sets in which is complete in a few minutes. Cooling with ice water is necessary when the reaction starts. After the mixture has cooled to room temperature there is added 4.4 parts by weight of sulfur, and 20 parts by weight of PCl₃. The mixture becomes warm and after refluxing 15–30 minutes the reaction is complete without getting violent. The crude PSCl₃ is distilled directly from the flask and yields 42–44 parts by weight of PSCl₃, B. P. 122–123° C. The product contains traces of iodine and has, therefore, a pink color. Iodine may be removed from the PSCl₃ by treating with an ice cold solution of dilute NaOH, from which iodine can be regained. The PSCl₃ may be redistilled but it is quite pure after drying with CaCl₂. The dark residue after the distillation becomes hard after cooling. It decomposes violently when treated with water, evolving H₂S. When heated the residue evolves violet iodine vapors. From this residue iodine also can be regained.

*Example 11*

For the initial charge in Example 10 there is substituted 5.0 parts by weight of sulfur, 0.3 part by weight Al powder, 0.05 part by weight iodine and 20 parts by weight of PCl₃. The procedure is the same as in Example 10. After 45 minutes the boiling mixture is colorless and after 50 minutes a violent reaction starts (controlling with ice water). Now are added 4.4 parts by weight of sulfur and 20 parts by weight of PCl₃ and it is continued as in Example 10. The reaction is complete within 12–20 minutes. Yield: 44–45 parts by weight of PSCl₃, B. P. 122–123° C.

*Example 12*

For the initial charge in Example 10 there is substituted 5.0 parts by weight of sulfur, 0.2 part by weight of iodine and 20 parts Al powder, 0.05 part by weight of PCl₃, otherwise the procedure and quantities employed are the same as in Example 10. The reaction mixture becomes colorless after 35–40 minutes and after 45 minutes a vigorous reaction takes place. Continuing as in Example 10 there is obtained 42–44 parts by weight of PSCl₃ (iodine containing) B. P. 123–124° C.

Although an excess of the metal is advantageous in order to facilitate the formation of the unknown catalysts, the experimental evidence indicates that only small amounts, in the case of aluminum, and traces, in respect to iron, participate in the reaction. Strong heating of the boiling PCl₃ is advantageous in order to shorten the reaction time. During the heating nearly all of the aluminum is converted into unknown compounds so it cannot be conveniently regained. The unknown compounds formed are not capable of catalyzing a new reaction of PCl₃ and sulfur.

It is intended to cover all changes and modifications of the examples of the invention herein chosen for purposes of disclosure which do not constitute departures from the spirit and scope of the invention.

What is claimed is:

1. A method of preparing PSCl₃ which comprises reacting PCl₃ with sulfur in the presence of a catalyst mixture comprising a member of the group consisting of chlorine and bromine and mixtures thereof and a member of the group consisting in iron powder, aluminum powder and mixtures thereof said catalyst mixture also including a trace of iodine.

2. The method of claim 1 in which the reaction is carried out at refluxing temperature.

3. A method of preparing PSCl₃ which comprises reacting PCl₃ with sulfur in the presence of a catalyst mixture comprising per 100 parts of PCl₃, about 3 parts powdered iron, 2–3 parts bromine and 0.2–0.8 part iodine.

4. A method of preparing PSCl₃ which comprises reacting PCl₃ with sulfur in the presence of a catalyst mixture comprising per 100 parts of PCl₃, about 1 part aluminum powder, 0.8–1.0 part bromine and 0.2–0.3 part iodine.

5. A method of preparing PSCl₃ which comprises reacting PCl₃ with sulfur in the presence of a catalyst mixture comprising a mixture of iron and aluminum powder, bromine and iodine.

6. A method of preparing PSCl₃ which comprises reacting PCl₃ with sulfur in the presence of a catalyst mixture comprising per 100 parts of a cold solution of PCl₃ saturated with chlorine, about 3 parts powdered iron and about 0.5 part of iodine.

7. A method of preparing PSCl₃ which comprises reacting PCl₃ with sulfur in the presence of a catalyst mixture comprising a cold saturated solution of PCl₃ with chlorine, aluminum powder and iodine.

8. A method of preparing PSCl₃ according to claim 6 in which the crude PSCl₃, containing the catalyst, is able to convert a new charge of PCl₃ and sulfur into PSCl₃.

References Cited in the file of this patent

UNITED STATES PATENTS

| | | |
|---|---|---|
| 2,575,316 | Jonas et al. | Nov. 13, 1951 |
| 2,575,317 | Jonas et al. | Nov. 13, 1951 |
| 2,591,782 | Cook | Apr. 8, 1952 |